No. 860,317. PATENTED JULY 16, 1907.
W. G. OSBORN.
CORN SHOCK LOADER.
APPLICATION FILED OCT. 29, 1906.
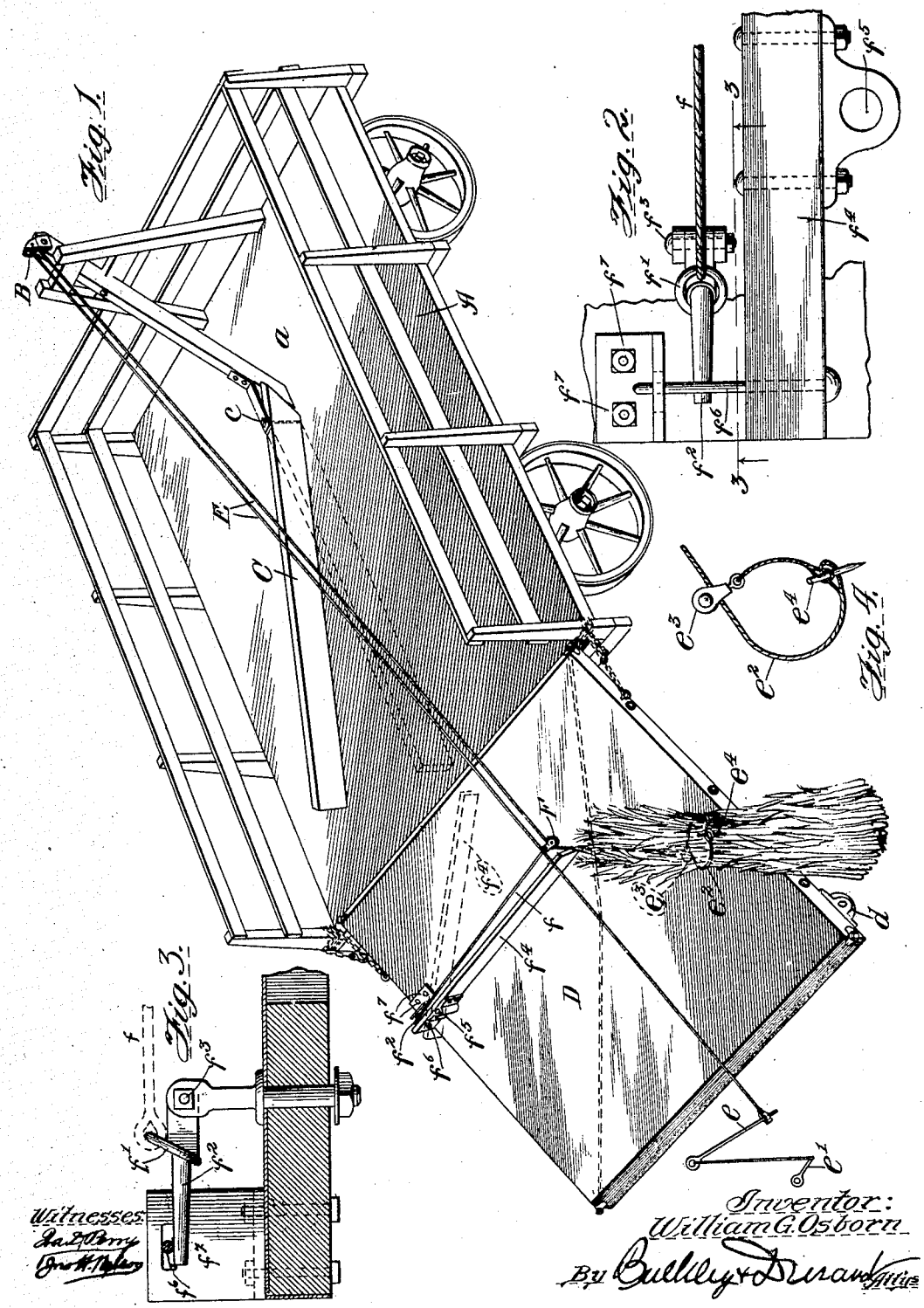

UNITED STATES PATENT OFFICE.

WILLIAM G. OSBORN, OF GARY, INDIANA.

CORN-SHOCK LOADER.

No. 860,317.     Specification of Letters Patent.     Patented July 16, 1907.

Application filed October 29, 1906. Serial No. 340,963.

*To all whom it may concern:*

Be it known that I, WILLIAM G. OSBORN, a citizen of the United States of America, and a resident of Gary, Indiana, have invented a certain new and useful Improvement in Corn-Shock Loaders, of which the following is a specification.

My invention relates to apparatus for loading corn-shocks or bundles of like material onto a wagon.

The object of my invention is the provision of an arrangement by which the corn shock or bundle of material can be loaded by simply hitching the apparatus to the same and then driving the wagon ahead a short distance.

To the foregoing and other useful ends, my invention consists in matters hereinafter set forth and claimed.

In the accompanying drawings, Figure 1 is a perspective of a wagon equipped with my improved loading apparatus. Fig. 2 is an enlarged detail plan view of the automatic trip. Fig. 3 is a section on line 3—3 in Fig. 2. Fig. 4 is a perspective of the hitch.

As thus illustrated, my invention comprises a wagon A of any suitable form or construction. At the forward end thereof is an elevated sheave or pulley B. A swinging guide-bar C is pivoted at $c$ and adapted to extend rearwardly and centrally of the wagon bottom $a$. The tail-board D is adapted to swing down and rest on the ground to provide an incline up which the shocks can be pulled. Wheels $d$ can be provided for said tail-board. Said board is preferably braced and strengthened to resist the strains to which it is subjected. The loading cable E is secured to the ground by stakes $e$ and $e^1$, as shown, and extends around said sheave or pulley B. The other end of said cable is provided with a loop or hitch $e^2$ having a tightening sheave or pulley $e^3$ and held together at one side by a pin $e^4$. Said cable runs around a sheave or pulley F secured to a rope $f$. This rope $f$ is secured to a ring $f^1$ on the trip $f^2$, the latter being pivoted at $f^3$. A trip-bar $f^4$ is pivoted upon the tail-board at $f^5$ and provided with a pin $f^6$. This pin extends through the bracket $f^7$ secured to the tail-board. When the trip-bar $f^4$ is swung to the position shown in dotted lines, the pin $f^6$ is disengaged from the bracket, and the trip $f^2$ is allowed to swing up and over to release the ring $f^1$. After the loop or hitch is placed about the corn shock, the wagon is then driven ahead a short distance, thus throwing the shock over onto the tail-board. The shock strikes the trip-bar $f^4$ and causes the release of the pulley F. This permits the motion of the wagon to draw the shock up the tail-board and onto the wagon. The shock will go to the right or left, according to the adjustment of the guide-bar C. Then the pin $e^4$ is pulled out and the shock thus released from the loop or hitch. In this way, the wagon can be driven along a row of shocks, loading the shocks on as it moves from one to the other.

What I claim as my invention is:

1. Means for loading corn shocks onto a wagon, comprising a cable, means for holding the cable to the shock, means for securing the other end of the cable to the ground, a tail-board adapted to trail along the ground and means for loading the shock up the tail-board when the wagon is driven ahead, said tail-board provided with means for engaging said cable to pull the shock onto the board from a position at the side thereof.

2. Means for loading corn shocks onto a wagon, comprising a cable, means for securing the cable to the shock, means for securing the other end of the cable to the ground, a tail-board adapted to trail along the ground and sheaves mounted on the wagon and engaging said cable, one of said sheaves being on the tail-board, for the purpose set forth.

3. In a corn shock loading apparatus, the combination of a wagon, an incline for the rear of the wagon, a sheave at the front of the wagon, a sheave carried on the incline, a cable running around said sheaves, a hitch or loop at one end of said cable, a pin closing the hitch at one side, a pulley for tightening the hitch around the shock, means for securing the other end of the cable to the ground, means for automatically releasing the sheave on the incline when the shock is thrown thereon by the forward motion of the wagon, and means for directing the shock to the right or left in the wagon.

4. In a corn-shock loading apparatus, the combination of a wagon, a loading cable running forward and back of the wagon, a tail-board adapted to trail along the ground, and means for operating said cable and loading the shock up the tail board by the forward motion of the wagon, said tail-board provided with means for engaging said cable to swing the shock into position.

5. In a corn-shock loading apparatus, the combination of a vehicle, a loading cable, an incline, means for operating said cable by the forward motion of the vehicle, and means on said cable to swing the shock onto the incline.

6. In a corn-shock loading apparatus, the combination of a vehicle, a loading cable, an incline, means for operating said cable, and means on the incline for engaging said cable to swing the shocks onto the incline.

7. Means for loading corn-shocks onto a wagon, comprising a loading cable, an incline, a sheave on the incline engaging said cable to swing the shockers to the incline, and automatic means for detaching said sheave from the incline when the shock starts up the latter.

8. Means for loading corn-shocks onto a wagon, comprising a swinging board for directing the shocks to the right or left in the wagon.

9. Means for loading corn-shocks onto a wagon, comprising a loading cable provided with a loop, a short cable provided with a loop at one end and a sheave at the other, said sheave engaging the loading cable, and a pin inserted through the two loops.

10. Means for loading corn-shocks onto a wagon, comprising an incline, a loading cable, a sheave secured to the incline and engaging the cable to swing the shock onto the incline, and a movable member in the path of the shock and connected to automatically disconnect the sheave from the incline when the shock starts up the latter.

Signed by me at Chicago, Ill., this 26th day of Oct., 1906.

WILLIAM G. OSBORN.

Witnesses:
   ALBERT JOHN SAUSER,
   J. NORBY.